US006676777B2

(12) United States Patent
Kimura et al.

(10) Patent No.: US 6,676,777 B2
(45) Date of Patent: Jan. 13, 2004

(54) POSTWELD HEAT TREATMENT PROCESS OF CARBON STEEL AND LOW ALLOY STEEL

(75) Inventors: Kazuhiro Kimura, Ibaraki (JP); Masayoshi Yamazaki, Ibaraki (JP); Hiromichi Hongo, Ibaraki (JP); Junichi Kinugawa, Ibaraki (JP); Takashi Watanabe, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 55 days.

(21) Appl. No.: 10/085,099

(22) Filed: Mar. 1, 2002

(65) Prior Publication Data

US 2002/0170634 A1 Nov. 21, 2002

(30) Foreign Application Priority Data

Mar. 2, 2001 (JP) ........................................ 2001-058203

(51) Int. Cl.[7] ................................................ C21D 9/50
(52) U.S. Cl. ...................................... 148/529; 148/644
(58) Field of Search ................................ 148/529, 644, 148/639, 9, 516, 528

(56) References Cited

PUBLICATIONS

Kimura, K., et al. "Improvement in Creep Strength of Welded Joint of 2.25Cr–1Mo Steel by PWHT", Current Advances in Materials and Processes, The Iron and Steel Institute of Japan, vol. 14, No. 3 (2001), p. 659.
Kimura, K., et al., "Effect of annealing heat–treatment on long–term creep strength of 2.25Cr–1Mo steel", 123 Committee of Heat–resistant Metals Research report, Japan Society for the Promotion of Science, vol. 42, No. 2 (2001), pp. 113–125.

Kimura, K., et al. "Improvement of Long–term Creep Strength of 2.25Cr–1Mo Steel Welded Joint by a New Post Weld Heat Treatment", Proceedings of the 7th International Symposium of Japan Welding Society, Japan Welding Society, vol. 2 (2001), pp. 767–772.

Kimura, K., et al. "Effect of Initial Microstructure on Inherent Creep Strength of Ferritic Steels", Current Advances in Materials and Processes, The Iron and Steel Institute of Japan, vol. 12, No. 6 (1999), p. 1317.

Kimura, K., et al. "Influence of Y/β transformation behavior on long–term creep strength of low alloy ferritic steel", 123 Committee of Heat–resistant Metals Research report, Japan Society for the Promotion of Science, vol. 41, No. 1 (2000), pp. 51–62.

Kimura, K., et al. "Effect of Initial Microstructure on the Long Term Creep Strength of a Low Alloy Cr–Mo Steel", Parsons 2000 Advanced Materials for 21st Century Turbines and Power Plant, The Institute of Materials, London, U.K., 1997, pp. 558–571.

Kimura, K., et al. "Effect of Initial Microstructure on Long Term Creep Strength of a Low Alloy Ferritic Steel", Iron and Steel, The Iron and Steel Institute of Japan, vol. 86, No. 8 (2000), pp. 44–51.

Primary Examiner—Deborah Yee
(74) Attorney, Agent, or Firm—Wenderoth, Lind & Ponack, L.L.P.

(57) ABSTRACT

The creep strength of a welded joint portion is improved, and damage of the welded joint portion based on the generation or development of cracks is suppressed. A postweld heat treatment process, wherein a welded joint made of carbon steel and low alloy steel is held within austenite single-phase temperature range for a given time and subsequently the joint is cooled by air-cooling or by slow cooling at a cooling rate lower than that of the air-cooling.

4 Claims, 10 Drawing Sheets

POSTWELD HEAT TREATMENT PROCESS OF CARBON STEEL AND LOW ALLOY STEEL

TECHNICAL FIELD

The present invention relates to a postweld heat treatment process of carbon steel and low alloy steel, particularly to a postweld heat treatment process of carbon steel and ferrite-based heat resistant steel that is used at high temperature, which causes a problem of creep, for a long time.

BACKGROUND ART

Hitherto, in a welded joint portion where a weld metal or a welded heat affected zone is present, a drop in mechanical strengths such as tensile strength and creep strength has been caused and cracks have easily been generated and developed because of inhomogeneous texture generated by welding.

Conventionally, therefore, postweld heat treatment has been performed in order to reduce such a drop in mechanical strengths based on welding.

For example, in JIS Z3700 (postweld heat treatment process), the postweld heat treatment process of carbon steel and low alloy steel is defined. According to this standard, materials are divided to 6 kinds of P-1 to P-5 and P-9, and for each of the kinds a lowest holding temperature of postweld heat treatment is decided and further a shortest holding time, dependently on the thickness of weld zones, is also decided.

With respect to the temperature of the postweld heat treatment, It is prescribed that the upper limit of post heating temperature is not allowed to be over tempering temperature only about hardened and tempered steels made of the P-2 material and the P-9 material. On the other hand, about carbon steel and low alloy steel for which the upper limit of post heating temperature is not specified, it is prescribed that the upper limit of post heating temperature is usually set to a temperature 50° C. lower than the Ac1 temperature of the materials.

For example, FIG. 10 shows stress-fracture time curves at 550° C. about the base metal thereof (△), weld metal (□) and a welded joint (○) subjected to a normal postweld heat treatment (PWHT) in the prior art, which consist of 2.25Cr–1Mo steel (JIS SCMV4NT). This figure demonstrates that the creep strength of the welded joint subjected to the nomal postweld heat treatment is lower than that of the base metal at the side of short times.

In conventional postweld heat treatment, steel is held at 690° C. for 28 hours and cooled at a rate of 50° C. per hour (50° C./hour) or less. The long-term creep strength of a welded joint subjected to the conventional postweld heat treatment is not sufficiently improved, and damage based on the generation or development of cracks is not sufficiently suppressed.

On the other hand, the inventors recently made it evident that annealed structure generated by slow cooing from austenite temperature range has larger long-term creep strength than structure wherein martensite transformation or bainite transformation is generated.

Results of the examined mechanical strengths such as creep strength will be detailed hereinafter.

First of all, the following will describe an example in the prior art wherein 0.5Cr–0.5Mo steel was subjected to heat treatment to change initial texture, thereby yielding ferrite/perlite texture. According to this example, the following will be understood.

FIGS. 7 and 8 are graphs showing the effect of initial textures on long-term creep strength, and demonstrate that in order to obtain materials having high long-term creep strength, it is important to cool the materials slowly at a cooling rate lower than that of air-cooling from austenite single-phase temperature range.

The initial textures are different on the basis of difference in cooling rate from austenite single-phase temperature range. The cooling rate for martensite is largest, and that for bainite is middle. The cooling rate for ferrite plus perlite is lowest. Actually, ferrite plus perlite is subjected to furnace cooling.

The shown two kinds of tempered martensites are subjected to quenching followed by tempering treatment in the same way as in the martensite shown at the highest position.

FIG. 7 shows stress-fracture time curves of 0.5Cr–0.5Mo steels, which were obtained by changing the initial texture thereof by heat treatments. From this graph, it can be understood that within the long-term range of several tens of thousands of hours the annealed ferrite texture (black, diamond-shaped points: ◆) has a higher creep strength than the martensite texture (white round points ○) and the bainite texture (white square points: □), and also demonstrates that as time becomes longer, the annealed ferrite texture (black, diamond-shaped points) has a far higher creep strength than the martensite texture and the bainite texture.

FIG. 8 shows creep curves representing relationship between strain and time when the above-mentioned steels were kept at a temperature of 575° C. and at a constant stress of 3.2 kgf/mm$^2$. From this graph, it can be understood that the bainite texture (thick sold line) has a higher creep strength than the martensite texture (slightly thick sold line) but the annealed ferrite/perlite texture (thick dotted line) has a higher creep strength than the bainite texture.

As can be understood from the above, FIGS. 7 and 8 demonstrate that ferrite plus perlite (black, diamond-shaped points in FIG. 7) has the largest creep strength within the range of long times.

It can be therefore understood that ferrite plus perlite, for which cooling rate is small, has a larger long-term creep strength than martensite and bainite, for which cooling rate is large.

In turn, prepared were three kinds of 2.25Cr–1Mo steels whose initial textures were made different by different heat treatments, that is, JIS-STBA24 (annealing) JIS-SCMV4NT (normalizing, and tempering) and ASMEA542 (hardening, and tempering) Stress-fracture time curves of these steels at 550° C. are shown in FIG. 9.

In this graph (FIG. 9), the cooling rate from austenite single-phase temperature range is smallest for the annealing (○), is middle for the normalizing and tempering (△) and is largest for the hardening and tempering (□).

According to this graph, the following can be observed: within the high-stress and short-time area the hardened and tempered material (white round points) has the highest creep strength, but within the time range of several tens of hundreds of hours, in which the stress is 100 MPa or less, difference in creep strength among the three-kind steels becomes extinct and within the range of longer times the annealed material has a slightly higher creep strength. Therefore, in the case that use of the steels in an actual plant for a long time is considered, low short-term creep strength generated by slow cooling at a small cooling rate is not brought into a problem.

That is, a material cooled slowly at a cooling rate lower than that of air-cooling from austenite single-phase temperature range has a lower short-term creep strength than a quenched material. But, in the case that these materials are used in an actual plant for a long time of 10 years or more the effect of high strength based on the quenching becomes extinct. Therefore, in the case that use of the materials in an actual plant is considered, a drop in short-term creep strength generated by slow cooling at a cooling rate lower than that of air-cooling is not brought into a problem.

However, the conventional heat treatment is performed also to the steel materials having an excellent long-term creep strength. And, there remains a problem that in a welded joint portion where a weld metal or a welded heat affected zone is present, a drop in mechanical strengths such as tensile strength and creep strength is still caused and cracks are easily generated and developed because of inhomogeneous texture generated by welding.

In light of the above-mentioned situations, an object of the present invention is to provide a postweld heat treatment process which is more effective particularly for an improvement in long-term creep strength and suppression of damage based on the generation or development of cracks than conventional postweld heat treatment processes.

DISCLOSURE OF THE INVENTION

In order to solve the above-mentioned problems, according to a first aspect of the present invention, there is provided a postweld heat treatment process comprising the steps of holding a welded joint made of carbon steel or low alloy steel within austenite single-phase temperature range for a given time, thereby annealing the joint, and subsequently cooling the joint by air-cooling or by slow cooling at a cooling rate lower than that of the air-cooling.

According to a second aspect of the present invention, considering annealing temperature, a cooling means and cooling temperature, there is provided a postweld heat treatment process wherein the joint is held at 930° C. for 30 minutes and is cooled by furnace cooling. According to a third aspect of the present invention, there is provided a postweld heat treatment process wherein the cooling rate upon the furnace cooling is set to 1° C. per minute.

According to the present invention, by performing annealing (slow cooling from temperature Ac3 or more in austenite temperature range) as postweld heat treatment, the long-term creep strength of the welded joint is improved. Moreover, by causing inhomogeneous texture generated by the welding to extinct, it is possible to suppress essentially damage based on the generation or development of cracks resulting from the inhomogeneous texture.

About many high-temperature buildings such as boilers/turbines for power generation, atomic power generation facilities and plants for petroleum industry or petrochemical industry, the life spans thereof are controlled by damage of their welded joint portions. Therefore, by the postweld heat treatment of the present invention, it is possible that the safety and reliability thereof are improved and further the life spans thereof are prolonged.

BEST MODE FOR CARRYING OUT THE INVENTION

Figure 1:
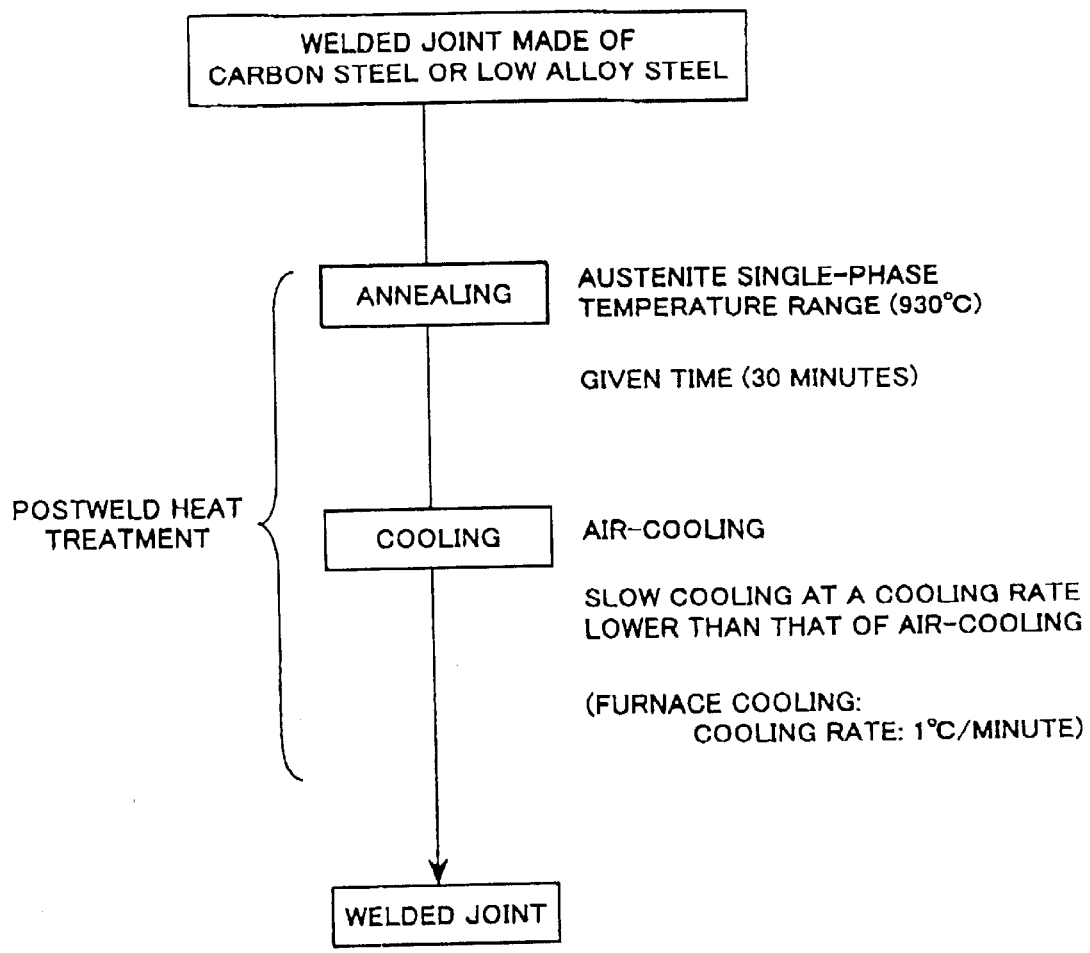
FIG. 1 is a flowchart of the new postweld heat treatment of the present invention.

Embodiment of the present invention will be described hereinafter.

In the present invention, the requirement "cooling from austenite single-phase temperature range is made to slow cooling at a cooling rate lower than that of air-cooling" is induced from the finding that ferrite plus perlite has the highest creep strength within the range of long times and ferrite plus perlite, for which cooling rate is small, has a larger long-term creep strength than martensite or bainite, for which cooing rate is large.

In order to perform annealing heat treatment sufficiently in the present invention, it is necessary to hold steel in austenite single-phase temperature range and subsequently cooling the steel at a slow rate which is lower than the cooling rate of air-cooling. The wording "air-cooling" means "natural cooling in the air in a standstill state". In accordance with the cooling rate prescribed in the above-mentioned JIS 3700 (postweld heat treatment), the wording "air-cooling" can be defined as, for example, "a cooling rate of 280° C./hour or less".

In general, material expands or shrinks thermally with a change in temperature. At the time of cooling the material, the material shrinks. When polycrystal material is quenched, the deformation of each of its crystal particles, following thermal shrinkage, cannot be relived so that strain accumulates inside. In an extreme case, the material is fractured by quench cracks.

In the case that fracture as seen in such an extreme case is not caused but a great deal of strain accumulates inside by quenching, a domain in which very large stress is microscopically generated is locally formed even by slight external force. Such a large stress-generated domain causes plastic deformation beyond elastic deformation so that dislocation is released. As a result, creep deformation is caused. It is therefore important that strain is not accumulated inside material at the time of cooling the material. Needless to say, quenching is not preferred. In order not to form a domain wherein large stress is generated even at a microscopic level, from the viewpoint contrary to the above-mentioned viewpoint a cooling rate larger than the cooling rate of air-cooling is set as the criterion of an unfavorable cooling rate in the present invention, counting on safety.

About conventional postweld heat treatment related to carbon steel and low alloy steel, the upper limit of heat treatment temperature thereof is a temperature 50° C. lower than tempering temperature or temperature Ac1. This temperature is within the temperature range which is considerably lower than austenite single-phase temperature range. In other words, the postweld heat treatment of the present invention is performed in austenite single-phase temperature range, which is considerably higher than conventional heat treatment temperature.

Postweld heat treatment is effective for carbon steel and low alloy steel. About 9–12 Cr high alloy steel, within the range of practical times the creep strength of annealed texture thereof is not higher than that of martensite texture or bainite texture.

Examples of the carbon steel and low alloy steel to which the present invention should be applied include not only steels described in JIS 3700 (postweld heat treatment process) but also steels according to foreign standards.

As illustrated in FIG. 1, the postweld heat treatment process according to the present invention is a postweld heat treatment process comprising the steps of holding a welded joint made of carbon steel or low alloy steel within austenite single-phase temperature range for a given time, and subsequently cooling the joint by air-cooling or by slow cooling at a cooling rate lower than that of the air-cooling. By the postweld heat treatment process of the present invention, annealed texture has a larger long-term creep strength than martensite texture and bainite texture. This is because the density of moving dislocation which causes creep deformation is low. Such a finding, which has been found out for the first time by this inventor, is an important basic principle about long-term creep strength and creep deformation, and is applied also to the postweld heat treatment for the first time.

Recommendable conditions about holding temperature and holding time in the new postweld heat treatment of the present invention are holding temperature and holding time for austenite temperature range in heat treatment conditions at the time of producing a base metal. More specifically, the holding temperature is limited to a temperature within austenite single-phase temperature range, and the holding time is a holding time for austenite single-phase temperature range at the time of heat treatment.

In the case that the new postweld heat treatment process of the present invention is applied to a welded joint portion, the properties of the welded joint portion, that is, the safety thereof and the reliability thereof can be improved. It is therefore possible to decrease damage of apparatus and accidents which are based on damage of the welded joint portion.

Referring to the drawings, the present invention will be more specifically described by way of Examples.

EXAMPLE

As illustrated in FIG. 1, in the new postweld heat treatment (PWHT) of the present example, there was adopted a process of subjecting a welded joint made of carbon steel or low alloy steel to a postweld heat treatment, holding the joint at an austenite single-phase temperature of 930° C. for 30 minutes, and cooling the joint by furnace cooling at a cooling rate of 1° C. per minute (1° C./minute).

2.25Cr–1Mo steel (JIS SCW 4 NT) plate with a thickness of 50 mm was used for a base metal. Chemical compositions of the base metal and weld metal are showed in Table 1.

TABLE 1

|  | C | Si | Mn | P | S | Cu | Ni | Cr | Mo | [wt %] Al |
|---|---|---|---|---|---|---|---|---|---|---|
| Base metal | 0.12 | 0.21 | 0.51 | 0.004 | 0.002 | 0.15 | 0.19 | 2.26 | 0.98 | 0.007 |
| Weld metal | 0.11 | 0.19 | 0.75 | 0.005 | 0.005 | 0.13 | 0.17 | 2.22 | 1.02 | 0.015 |

There is no significant difference in chemical composition between base metal and weld metal. The base metal was normalized for 100 minutes at 930° C. and tempered for 105 minutes at 730° C., as shown in Table 2.

TABLE 2

| Base metal | Normalizing | 930° C. × 100 min/Accelerated cooling |
|---|---|---|
|  | Tempering | 730° C. × 105 minm/Air cooling |
| PWHT | 690° C. | 690° C. × 28 h/Air cooling |
|  | 930° C. | 930° C. × 30 min/Furnace cooling |

Welding was performed by narrow gap sub-merged arc welding method, and the precise conditions of the welding was shown in the Table 3. The welding line was made into the right-angled direction to the base metal rolling direction. There may be adopted a process of opposing thick plates 30 mm or more in thickness to each other in the state that a space between their bevels would be smaller than the thickness of the plates, and then subjecting the plates to mechanized or automatic arc welding. About plates having a thickness of 200 mm or less, the size of the gap between their bevels is preferably about 20 mm or less. About plates having a thickness over 200 mm, the size thereof is preferably about 30 mm or less.

Then, any one of two types conditions of post weld heat treatment (PWHT), an annealing condition at the temperature in the austenite single phase region (930° C. PWHT) of the present invention and a conventional condition at the temperature below Ac2 (69° C. PWHT) to a comparison sake were employed.

TABLE 3

| Welding wire | JIS YS-2CM1 |
|---|---|
| Welding flux | MF-29N |
| Welding current (A) | 480~600 |
| Welding voltage (V) | 28~32 |
| Welding speed (cm/min) | 25~30 |
| Preheat temperature (° C.) | 200~226 |
| Interpass temperature (° C.) | 200~226 |
| Weld heat input (kJ/cm) | 31.6~37.2 |

Figure 2:
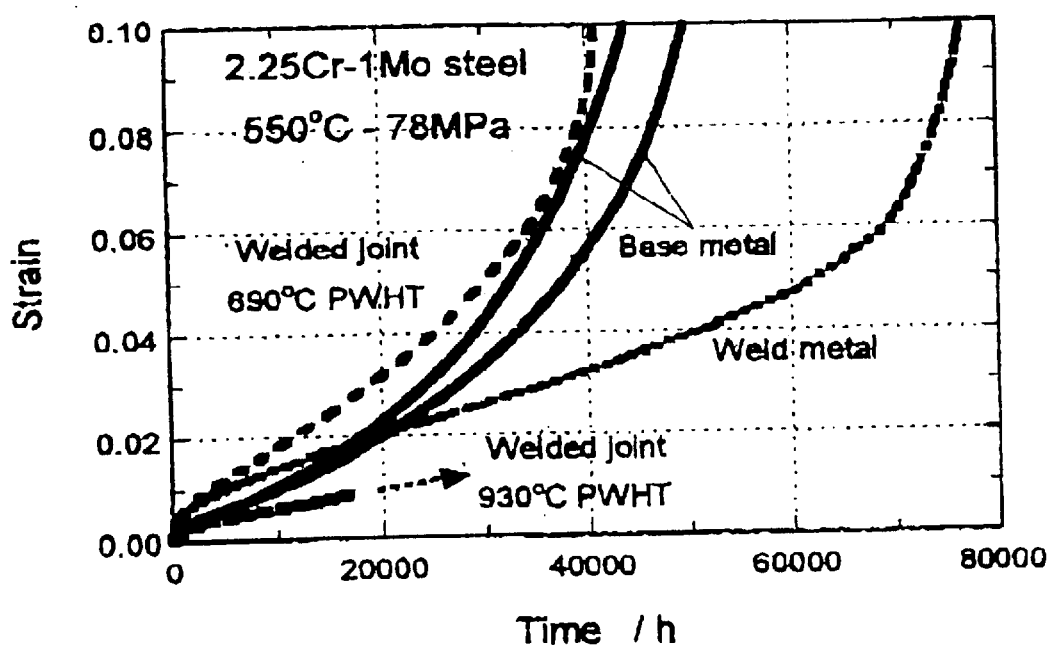
FIG. 2 is a graph showing creep curves of the base metal of 2.25Cr–1Mo steel, a weld metal, a welded joint subjected to an ordinary postweld heat treatment, and a welded joint subjected to a postweld heat treatment of the present invention.
Figure 3:
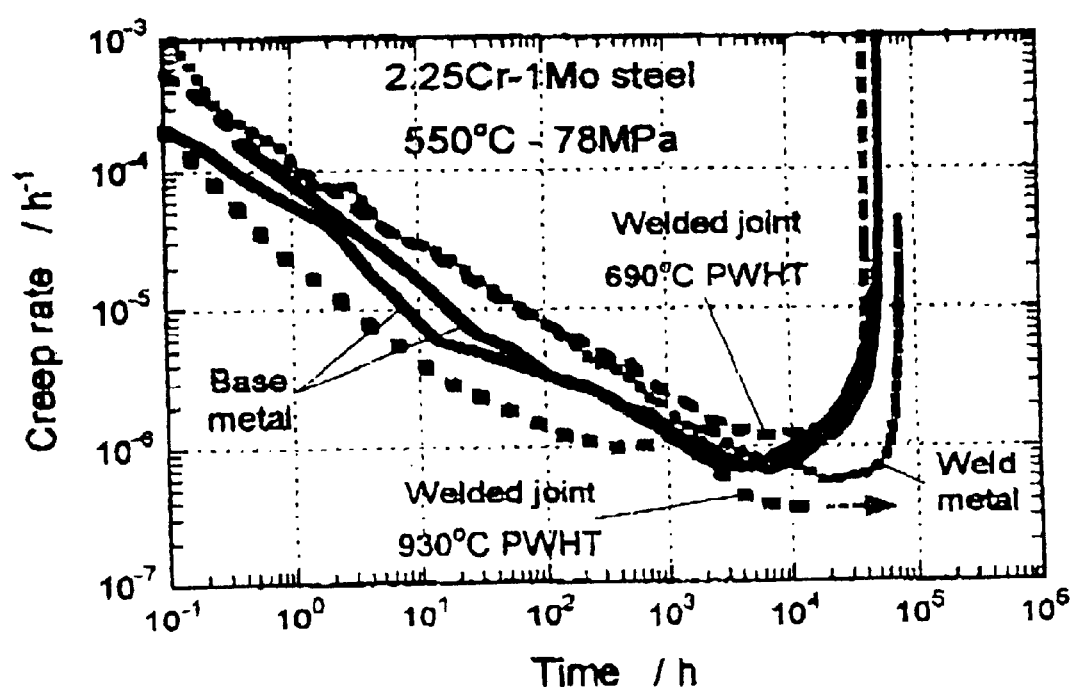
FIG. 3 is a graph showing creep rate-time curves of the base metal of 2.25Cr–1Mo steel, the weld metal, the welded joint subjected to the ordinary postweld heat treatment, and the welded joint subjected to the postweld heat treatment of the present invention.

The effect of full-annealing PWHT on creep strength was examined. Creep curves and creep rate vs. time curves at 550° C.–78 MPa (8 kgf/mm$^2$) of the base metal, the weld metal and the 690° C. PWHT and the 930° C. PWHT welded joints are shown in FIGS. 2 and 3, respectively. Creep testing time of the 930° C. PWHT welded joint is about 18,000 hours, and the creep test of it is still in progress as of Jun. 1, 2001.

Creep rupture strength under the creep test condition of 550° C.–78 MPa is considered to be governed by its inherent creep strength, as mentioned briefly in the background art. Creep strain at about 18,000 hours of about 0.009 for the 930° C. PWHT welded joint is smaller than those of the other materials, and it is about ⅓ of that of the 690° C. PWHT welded joint and about ½ of those of the weld metal and the base metal. Creep strain of the welded joint is obviously reduced by full annealing at 930° C. after welding, in comparison with the normal PWHT condition at 690° C. Moreover, it should be noted that the creep strain of the 930° C. PWHT welded joint is smaller than that of the base metal. Consequently, creep strength of the full-annealed 930° C. PWHT welded joint is higher than that of the normalized and tempered base metal From FIG. 3, although the creep rate of 930° C. PWHT welded joint is lower than other from immediately after a creep test start and it becomes of almost the same rate as the base metal in a region for 1,000 to 2,000 hours, it decreases further after that, and becomes ½ or less as compared with other in about 10,000 hours.

Figure 4:
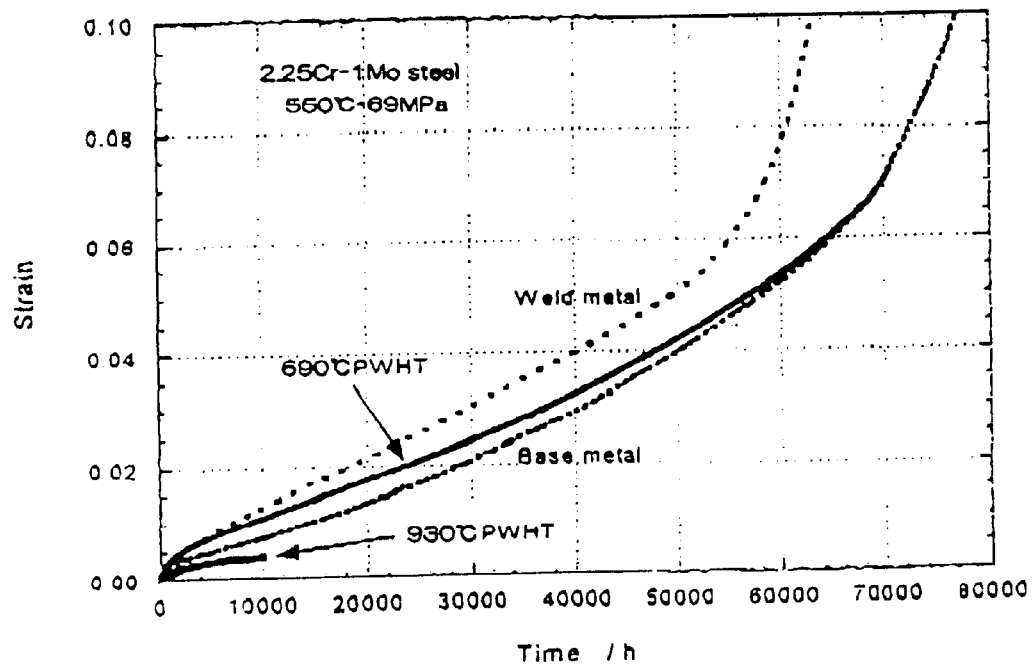
FIG. 4 is a graph showing creep curves of the base metal of 2.25Cr–1Mo steel, a weld metal, a welded joint subjected to an ordinary postweld heat treatment, and a welded joint subjected to a postweld heat treatment of the present invention.
Figure 5:
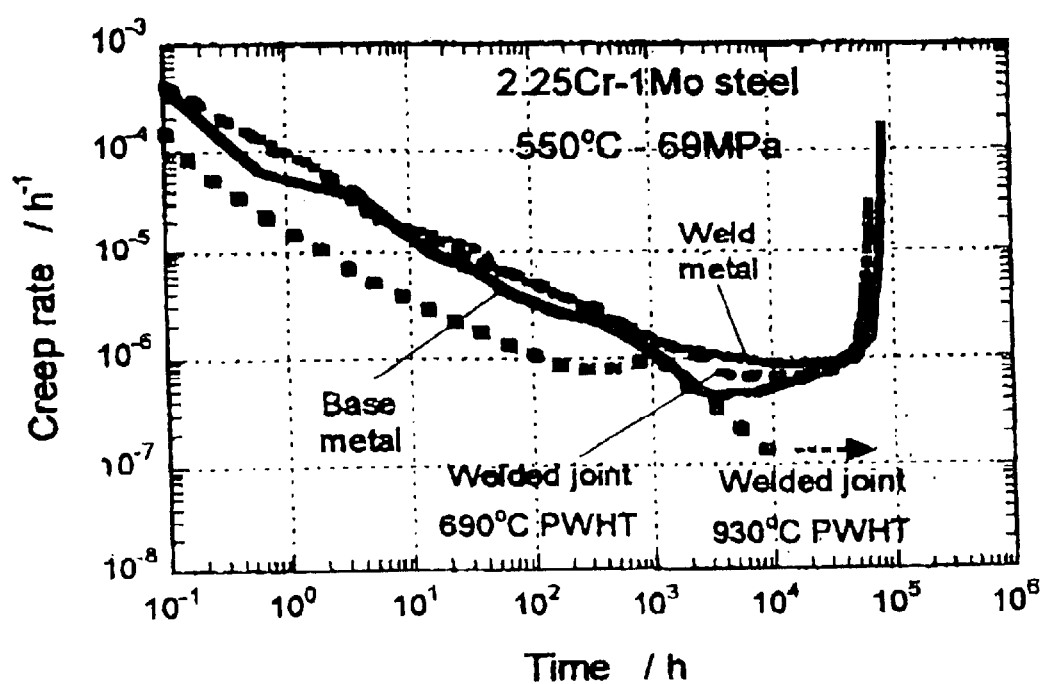
FIG. 5 is a graph showing creep rate-time curves of the base metal of 2.25Cr–1Mo steel, the weld metal, the welded joint subjected to the ordinary postweld heat treatment, and the welded joint subjected to the postweld heat treatment of the present invention.

Creep curves and creep rate vs. time curves at 550° C.–69 MPa (7 kgf/mm$^2$) of the base metal, the weld metal and the 690° C. PWHT and the 930° C. PWHT welded joints are shown in FIGS. 4 and 5, respectively. Creep testing time of the 930° C. PWHT welded joint is about 16,000 hours, and the creep test of it is still in progress as of Jun. 1, 2001.

It can be understood from FIG. 4 that in the same manner as in the case of 78 MPa, the 930° C. PWHT welded joints has a smaller creep strain than not only the 690° C. PWHT but also the base metal and the weld metal. Improving effect of the full-annealing PWHT at 930° C. on the creep strength of welded joint is obviously observed. In FIG. 5, very similar creep deformation behaviour and almost the same creep rupture life is observed for all the materials, except for the 930° C. PWHT welded joint. Creep rate vs. time curve of the 930° C. PWHT welded joint shows a hump at about 1,000 hours, and the creep rate of it is almost the same as those of the other materials at 1,000 hours. However, the creep rate of the 930° C. PWHT welded joint is smaller than those of the other materials before hump, it significantly decreases with increase in time after showing hump up to about 10,000 hours and the creep rate at 10,000 hours of the 930° C. PWHT welded joint is about ⅕ of those of the other materials.

Figure 6:
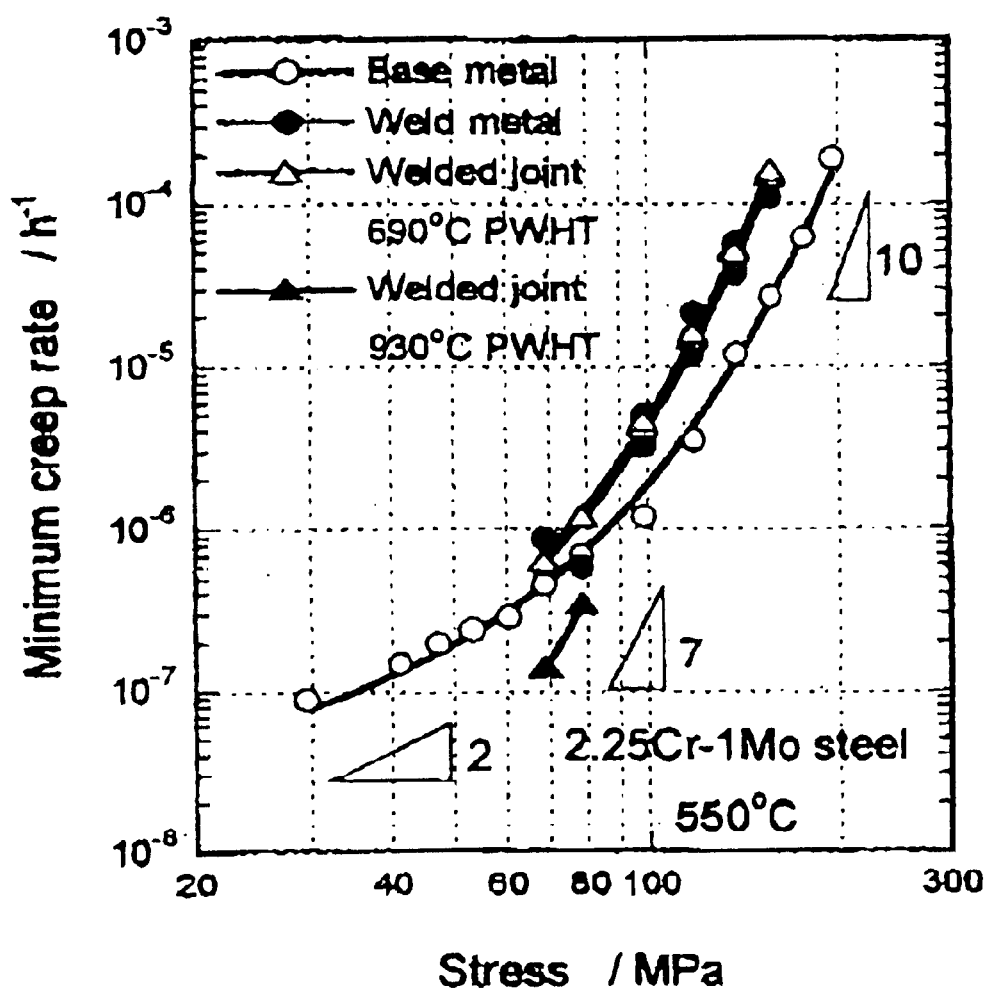
FIG. 6 is a graph showing stress vs. minimum creep rate curves at 550° C. of the base metal, the weld metal, and the welded joints subjected to 690° C. PWHT or 930° C. PWT.
Figure 7:
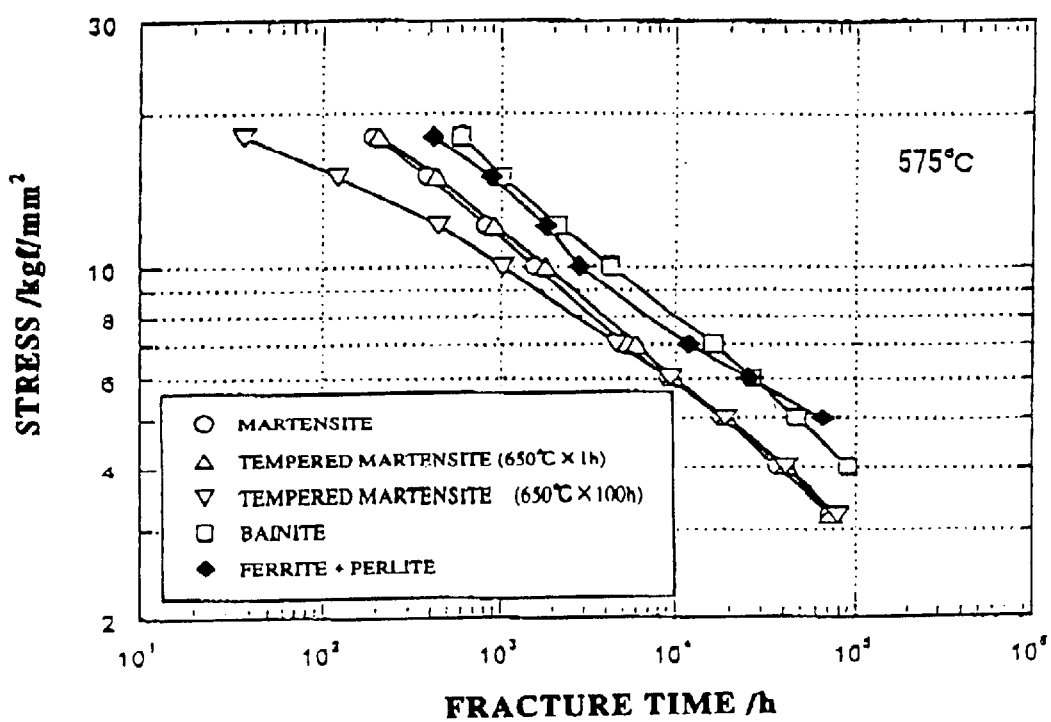
FIG. 7 is a graph showing stress-fracture time curves of 0.5Cr–0.5Mo steels.
Figure 8:
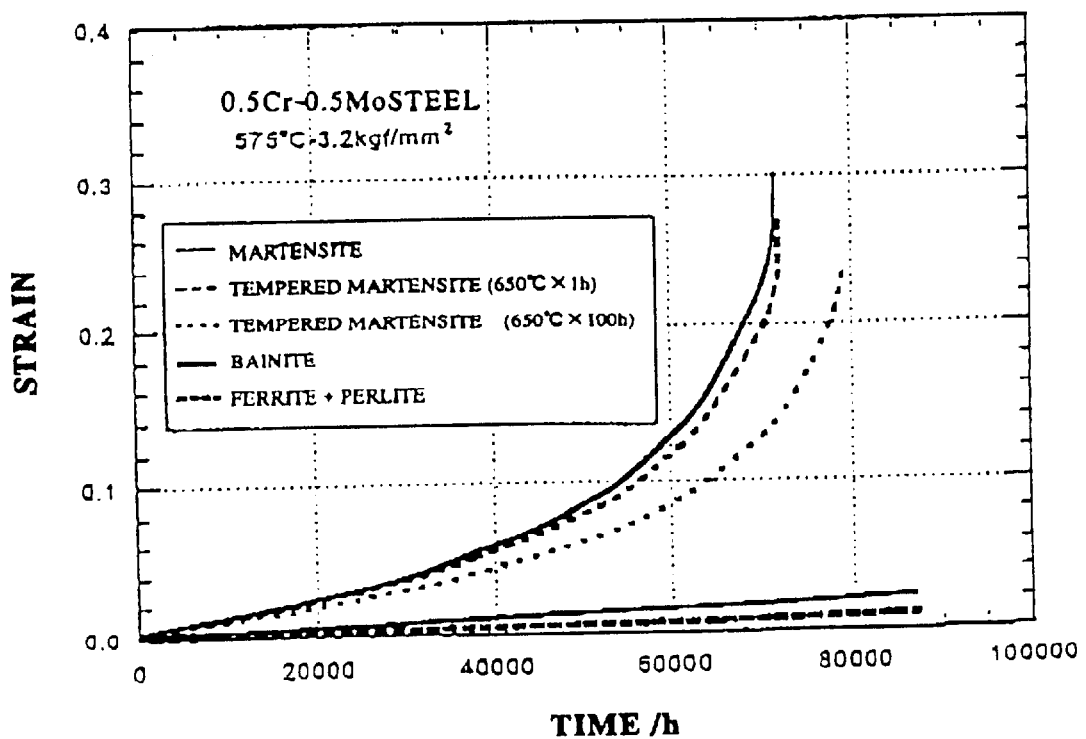
FIG. 8 is a graph showing creep curves of 0.5Cr–0.5Mo steels.
Figure 9:
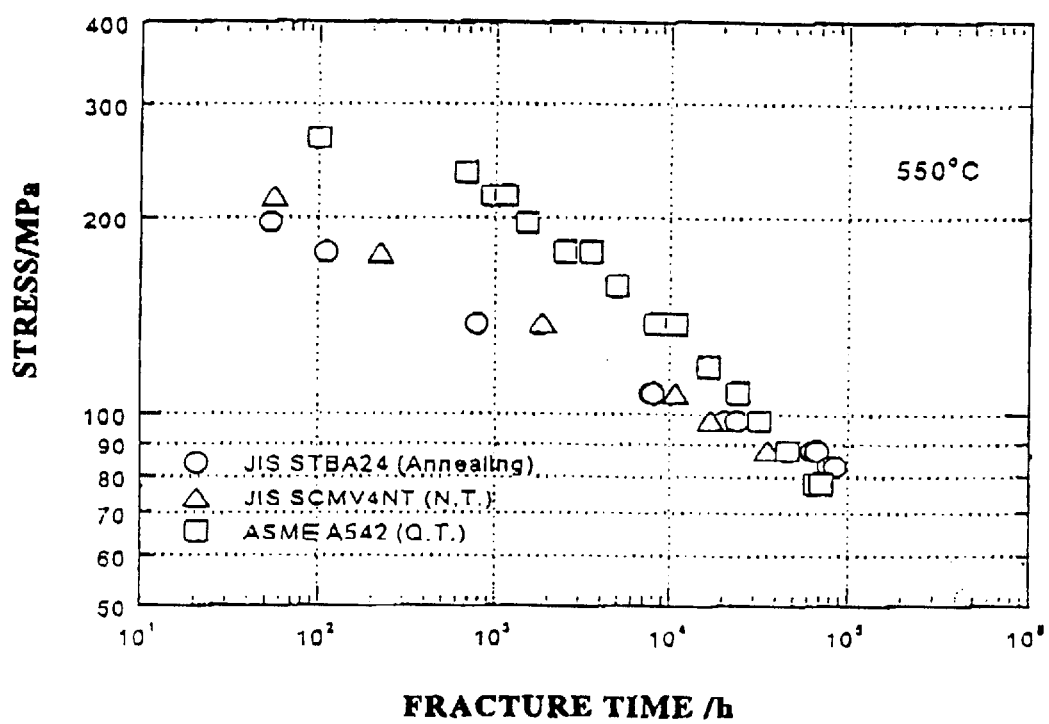
FIG. 9 is a graph showing stress-fracture time curves of 2.25Cr–1Mo steels.
Figure 10:
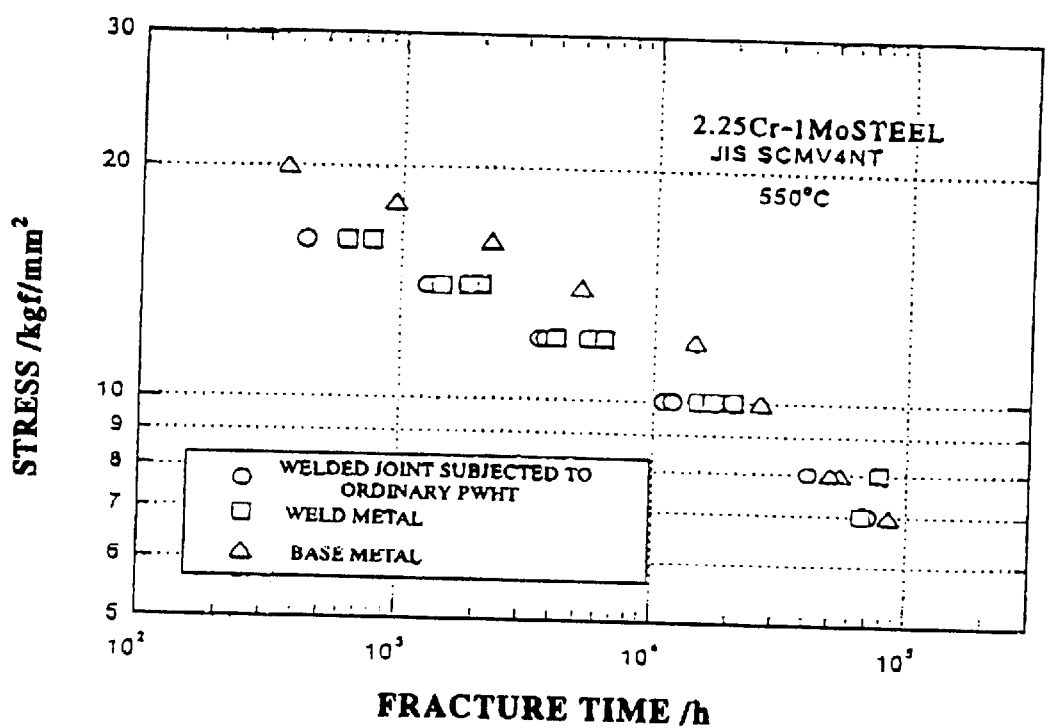
FIG. 10 is a graph showing stress-fracture time curves of the base metal of 2.25Cr–1Mo steel, a weld metal, and a welded joint subjected to an ordinary postweld heat treatment.

Stress vs. minimum creep rate curves at 550° C. of the base metal, the weld metal and the 690° C. PWHT and the 930 ° C. PWHT welded joints are shown in FIG. 6. The base metal has the big stress index of about 10 in the high stress region of about 200 MPa, the stress index decreases with reduction in stress, and becomes the small value of about 2 in the low stress region of 50 MPa or less. Minimum creep rate of the weld metal and the 690° C. PWHT welded joint is higher than that or the base metal in the higher stress condition. However, such differences decrease with decrease in stress and all the materials shows almost the same minimum creep rate at the stresses lower than 80 MPa, except for the 930° C. PWHT welded joint. As respects one the 930° C. PWHT welded joint, since the minimum creep rate decreases about ⅓ to ⅙ of that of other materials in 69 MPa although it is about ½ to ⅓ in 78 MPa, it can be said that the creep rate becomes lower as stress becomes small.

By the way, the annealed ferrite plus perlite structure shows a superior long-term creep strength to the martensite or the bainite structure because of lower movable dislocation density which leads creep distortion. Therefore, it is considered that this strengthening effect by full-annealing PWHT is accepted more notably as the low stress region where the amount of generating of the dislocation by stress load decreases. Then, it is considered that the tendency for the minimum creep rate of The 930° C. PWHT welded joint shown in FIG. 6 to be lower in 69 MPa than 78 MPa becomes more remarkable in further low stress region. It can be therefore considered that under conditions for using an actual plant wherein stress is lower than 69 MPa, the welded joint subjected to the new postweld heat treatment of the present invention has a higher creep strength than not only the welded joint subjected to the ordinary postweld heat treatment in the prior art but also the base metal and the weld metal.

Moreover, in 930° C. PWHT, because all of the weld metal and a heat affected zone (HAZ) hold in the austenite single phase temperature region, the uneven structure formed of welding disappears completely when the chemical composition of the base metal and the weld metal is almost the same, and the structure of the welding part turns into the same ferrite+perlite structure by annealing as the base metal. Therefore, it is expected that the uneven structure of the HAZ section is extinguished and the type IV crack generating itself can essentially be controlled by PWHT of the present invention.

Industrial Applicability

According to the present invention, the creep strength of welded joint portions can be improved and further damage of the welded joint portions based on the generation and development of cracks can be suppressed.

Consequently, it is possible to suppress damage of apparatus and the occurrence of accidents. Furthermore, the present invention gives important and new suggestion on development of not only welded joint portions but also heat-resistant steel having a high long-term creep strength.

The suppression of damage of welded joint portions and the occurrence of accidents contributes greatly to safe operation of plants. Since it can also be expected that the maintenance of plants can be made simpler than the prior art, costs for the maintenance can be reduced and the running efficiency of the plants can be improved. For these reasons, very large economic advantageous can be expected.

What is claimed is:

1. A postweld heat treatment process comprising the steps of holding a welded joint made of carbon steel or low alloy steel within austenite single-phase temperature range for a given time, thereby annealing the joint, and subsequently cooling the joint by air-cooling or by slow cooling at a cooling rate lower than that of the air-cooling.

2. The postweld heat treatment process according to claim 1, wherein the joint is held at 930° C. within the austenite single-phase temperature range for 30 minutes and is cooled by furnace cooling.

3. The postweld heat treatment process according to claim 1, wherein the cooling rate upon the furnace cooling is set to 1° C. per minute.

4. The postweld heat treatment process according to claim 2, wherein the cooling rate upon the furnace cooling is set to 1° C. per minute.

* * * * *